United States Patent [19]
Henderson

[11] Patent Number: 5,461,783
[45] Date of Patent: Oct. 31, 1995

[54] NEW STYLE TRIM KNIFE

[76] Inventor: Greg Henderson, 412 Westwood St., Opelika, Ala. 36801

[21] Appl. No.: 327,693

[22] Filed: Oct. 24, 1994

[51] Int. Cl.⁶ ................................................... B26B 5/00
[52] U.S. Cl. ................................. 30/124; 30/133; 30/317
[58] Field of Search .......................... 30/124, 133, 314, 30/317

[56] References Cited

U.S. PATENT DOCUMENTS

| | | | |
|---|---|---|---|
| 3,217,407 | 11/1965 | Azar | 30/133 |
| 3,331,130 | 7/1967 | Ligon | 30/133 |
| 5,142,786 | 9/1992 | Hunts | 30/133 |
| 5,153,994 | 10/1992 | Emmett | 30/133 |

FOREIGN PATENT DOCUMENTS

| | | | |
|---|---|---|---|
| 2467063 | 5/1981 | France | 30/133 |

OTHER PUBLICATIONS

"New Tip Trimmer Blade" from MTD, Jan. 1981.

*Primary Examiner*—Hwei Siu Payer
*Attorney, Agent, or Firm*—Michael I. Kroll

[57] ABSTRACT

A new style trim knife comprising a handle, a head on a first end of said handle and a blade. Components are for securing the blade to the head. A hand of a person can grasp the handle to allow the blade to cut off protrusions and rises left by a molding process on plastic, rubber and any other molded product at a work area. A facility is built into the head for removing by a suction action the loose cutoff protrusions and rises with a vacuum unit. The loose cutoff protrusions and rises will not cause damage to equipment located at the work area.

9 Claims, 2 Drawing Sheets

TO VACUUM UNIT

NEW STYLE TRIM KNIFE

BACKGROUND OF THE INVENTION

1. Field of the Invention

The instant invention relates generally to trimming devices and more specifically it relates to a new style trim knife.

2. Description of the Prior Art

Numerous trimming devices have been provided in prior art that are hand held tools used on various articles, so that scraps are left about after cutting, clipping, cropping, paring, pruning, shaving and shearing the articles. While these units may be suitable for the particular purpose to which they address, they would not be as suitable for the purposes of the present invention as heretofore described.

SUMMARY OF THE INVENTION

A primary object of the present invention is to provide a new style trim knife that will overcome the shortcomings of the prior art devices.

Another object is to provide a new style trim knife that will cut off with a saw-tooth blade, protrusions and risers left by a molding process on plastic, rubber and other molded products and remove the loose protrusions and risers by a suction action from a vacuum unit connected to the knife with an elongated flexible hose.

An additional object is to provide a new style trim knife that will help control the removal of loose protrusions and risers by the vacuum unit in an inspection area, where the protrusions and risers can be damaging to equipment located at a work area.

A further object is to provide a new style trim knife that is simple and easy to use.

A still further object is to provide a new style trim knife that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
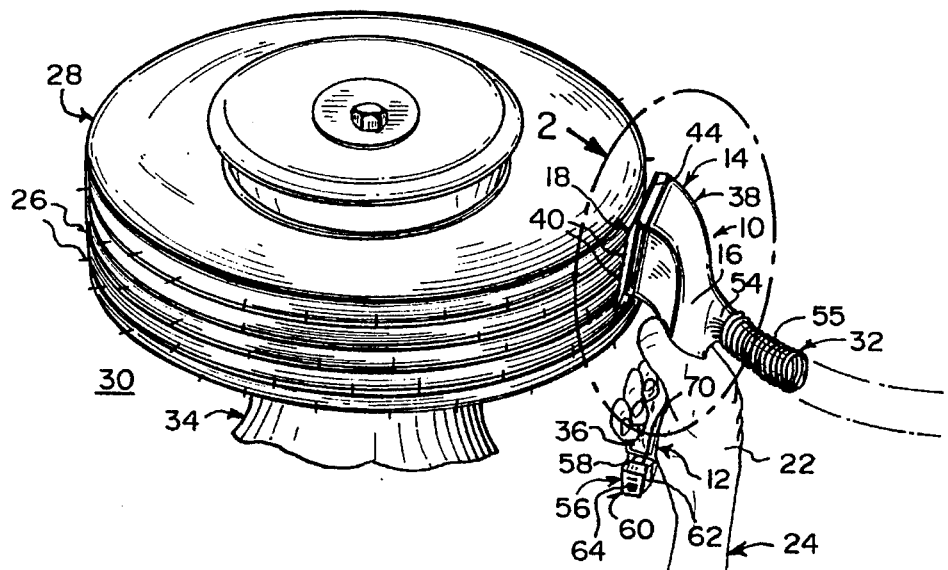
FIG. 1 is a perspective view of the instant invention grasped by a hand and being used in cutting off and removing protrusions and risers on a rubber tire by a suction action from a vacuum unit.
Figure 2:
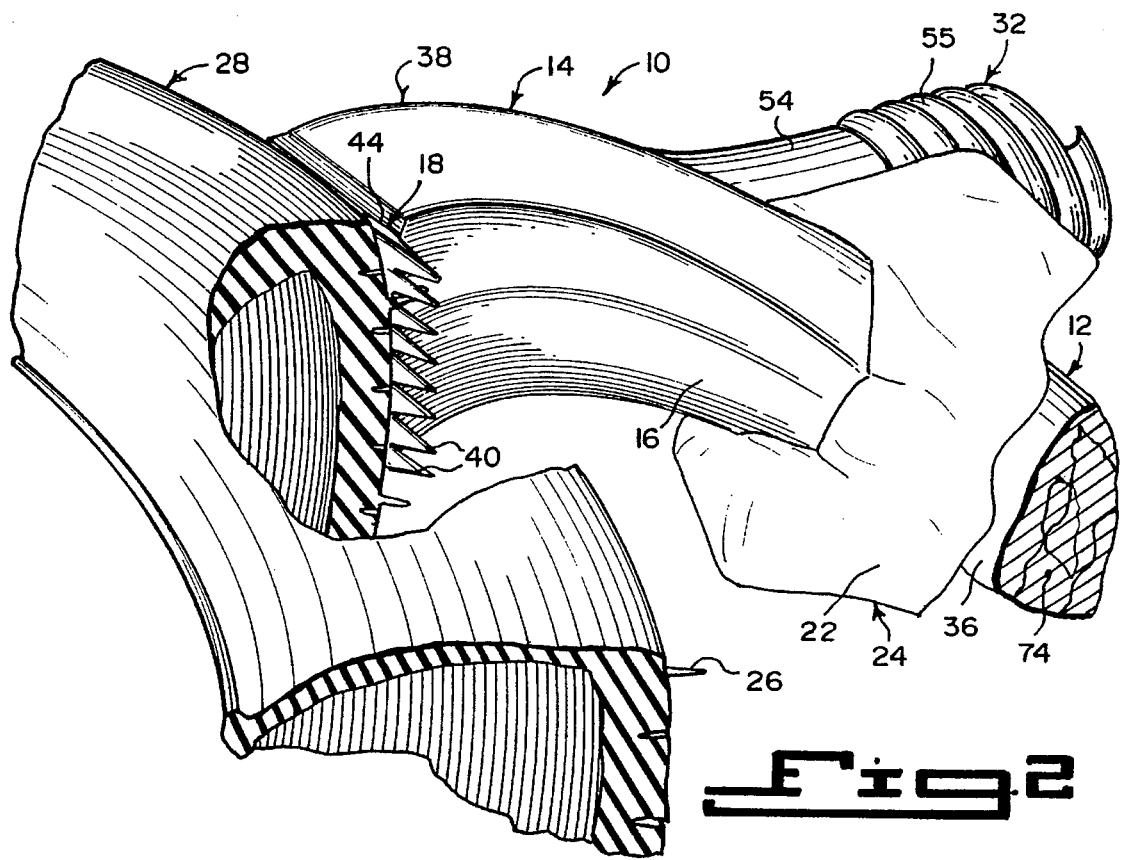
FIG. 2 is an enlarged perspective view with parts broken away and in section of the area indicated by arrow 2 in FIG. 1.
Figure 3:
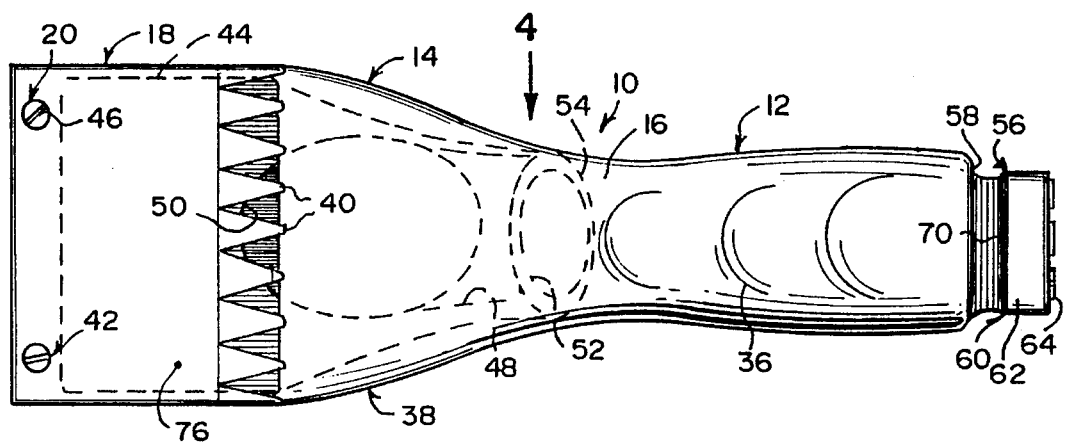
FIG. 3 is a bottom view of the instant invention.
Figure 4:
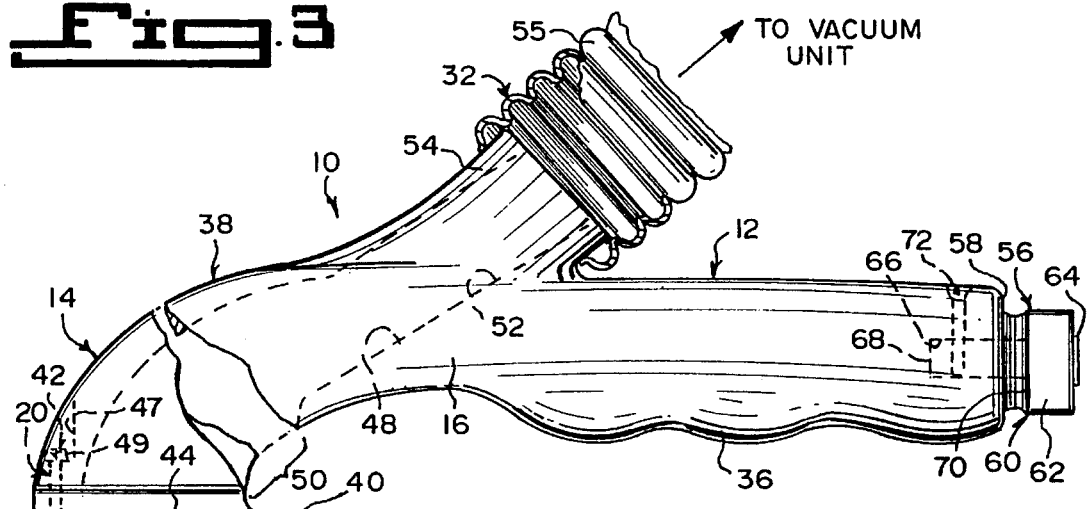
FIG. 4 is a side view with parts broken away taken in the direction of arrow 4 in FIG. 3.
Figure 5:
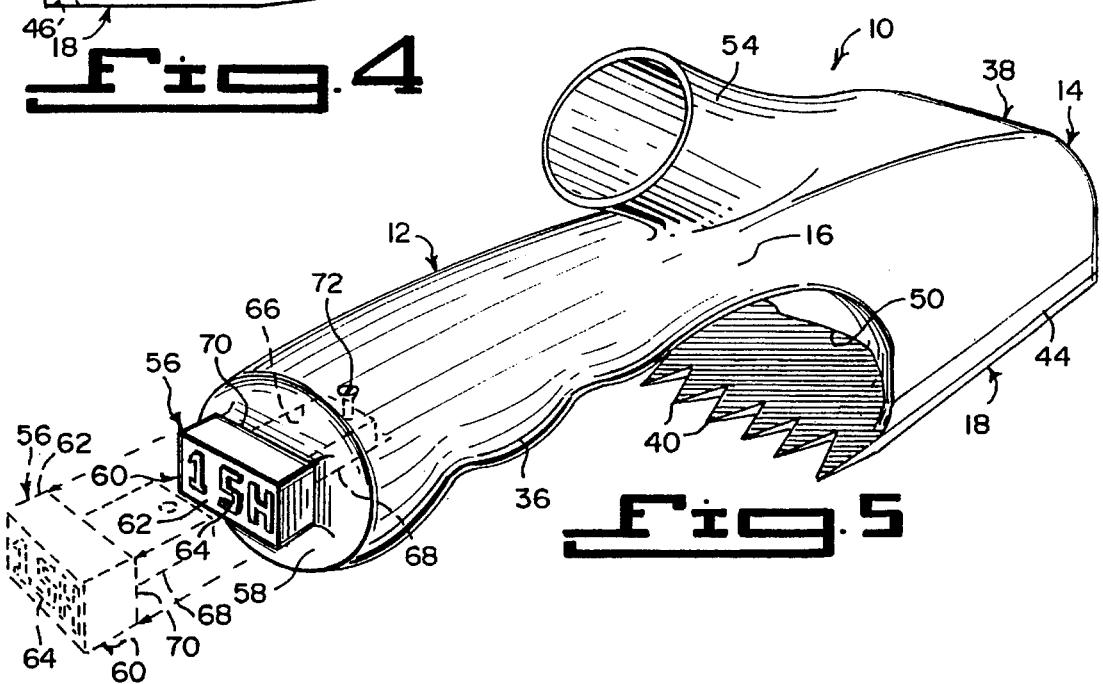
FIG. 5 is a rear perspective view of the instant invention.

Turning now descriptively to the drawings, in which similar reference characters denote similar elements throughout the several views, FIGS. 1 through 5 illustrate a new style trim knife 10, comprising a handle 12, a head 14 on a first end 16 of the handle 12 and a blade 18. Components 20 are for securing the blade 18 to the head 14. A hand 22 of a person 24 can grasp the handle 12, to allow the blade 18 to cut off protrusions and rises 26 left by a molding process on plastic, rubber and any other molded product 28 at a work area 30. A facility 32 is built into the head 14 for removing by a suction action the loose cut off protrusions and rises 26 with a vacuum unit (not shown). The loose cut off protrusions and rises 26 will not cause damage to equipment 34 located at the work area 30.

The handle 12 includes a finger grip 36 on an underside thereof, so that the hand 22 of the person 24 can better grasp the handle 12. The head 14 is a curved projection 38 extending downwardly from the first end 16 of the handle 12. The blade 18 contains a plurality of saw teeth 40 formed along one edge thereof.

The securing components 20 are a plurality of fasteners 42 to attach the blade 18 to a free end 44 of the curved projection 38. The blade 18 is set below and in parallel arrangement to the handle 12, with the saw teeth 40 extending rearwardly. The saw teeth 40 of the blade 18 can cut off the protrusions and rises 26, when the hand 22 of the person 24 grasps the handle 12 and pulls the handle 12 rearwardly. Each fastener 42 is a flat headed bolt 46, which extends through the blade 18 and into a cutout area 47 in the free end 44 of the curved projection 38. A nut 49 is threaded onto an end of the bolt 46 in the cutout area 47.

The suction removing facility 32 consists of the curved projection 38 having a hollow conduit 48 with a lower inlet port 50 adjacent and above the saw teeth 40 of the blade 18 and an upper outlet port 52 adjacent the first end 16 of the handle 12. A stub pipe 54 extends rearwardly at approximately a forty five degree angle from the outlet port 52 of the curved projection 38 at the first end 16 of the handle 12. An elongated flexible tube 55 is coupled at one end to the stub pipe 54 and at an opposite end to the vacuum unit.

A structure 56 is on a second end 58 of the handle 12, for making markings on the molded product 28 to identify the person 24 operating the knife 10 after the loose cut off protrusions and rises 26 have been removed therefrom by the suction action from the vacuum unit. The marking making structure 56 is a stamp member 60 at the second end 58 of the handle 12. The stamp member 60 includes a base 62, having at least one raised number and letter 64 thereon. An impression can be made into the molded product 28, to indicate the person 24 operating the knife 10.

The handle 12 has a recessed area 66 extending inwardly at the second end 58 thereof. A projection 68 extends from a rear surface 70 of the base 62, which fits into the recessed area 66. A setscrew 72 extends transversely into the handle 12 to engage with the projection 68, so as to retain the stamp member 60 against the second end 58 of the handle 12, thereby making the stamp member 60 removable and replaceable.

The handle 12, the finger grip 36, the curved projection 38, the stub pipe 54 and the stamp member 60 are all integral to each other and are made out of a durable strong material 74. The blade 18 with the saw teeth 40 is fabricated out of a durable metal material 76.

OPERATION OF THE INVENTION

To use the new style trim knife 10, the following steps should be taken:

1. Attach one end of the elongated flexible tube 55 to the vacuum unit.
2. Attach the other end of the elongated flexible tube 55 to the stub pipe 54.
3. Grasp the handle 12 with the finger grip 36 by the hand 22.
4. Place the saw teeth 40 of the blade 18 against the protrusions and risers 26 on the molded product 28.
5. Pull the handle 12 rearwardly, so that the saw teeth 40 will cut off the protrusions and rises 26 on the molded product 28, which will be sucked up through the lower inlet port 50 by the vacuum unit away from the equipment 34 at the work area 30.

LIST OF REFERENCE NUMBERS 10 new style trim knife
12 handle of 10
14 head of 10
16 first end of 12
18 blade of 10
20 securing component for 18
22 hand of 24
24 person
26 protrusion and riser on 28
28 molded product
30 work area
32 suction removing facility
34 equipment at 30
36 finger grip on 12
38 curved projection for 14
40 saw teeth on 18
42 fastener for 20
44 free end of 38
46 flat headed bolt for 42
47 cutout area in 44
48 hollow conduit in 38
49 nut for 42
50 lower inlet port in 38
52 upper outlet port in 38
54 stub pipe at 52 on 16
55 elongated flexible tube
56 marking making structure
58 second end of 12
60 stamp member for 56
62 base of 60
64 raised number and letter on 62
66 recessed area in 12 at 58
68 projection at 70
70 rear surface of 62
72 setscrew in 12
74 durable strong material for 12, 36, 38, 54 and 60
76 durable metal material for 18

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A new style trim knife comprising:

a) a handle, said handle including a finger grip on an underside thereof, so that a hand of a person can better grasp said handle;

b) a head on a first end of said handle, said head being a curved projection extending downwardly from the first end of said handle;

c) a blade, said blade including a plurality of saw teeth formed along one edge thereof;

d) means for securing said blade to said head, so that said hand of said person can grasp said handle to allow said blade to cut off protrusions and rises left by a molding process on plastic, rubber and any other molded product at a work area, said securing means including a plurality of fasteners to attach said blade to a free end of said curved projection, whereby said blade is set below and in parallel arrangement to said handle, with said saw teeth extending rearwardly, so that said saw teeth of said blade can cut off the protrusions and rises when the hand of the person grasps said handle and pulls said handle rearwardly; and e) means built into said head for removing by a suction action the loose cut off protrusions and rises with a vacuum unit, so that the loose cut off protrusions and rises will not cause damage to equipment located at the work area.

2. A new style trim knife as recited in claim 1, wherein each said fastener includes:

a) a flat headed bolt, which extends through said blade and into a cutout area in said free end of said curved projection; and b) a nut threaded onto an end of said bolt in said cutout area.

3. A new style trim knife as recited in claim 2, wherein said suction removing means includes:

a) said curved projection having a hollow conduit with a lower inlet port adjacent and above said saw teeth of said blade and an upper outlet port adjacent said first end of said handle;

b) a stub pipe extending rearwardly at approximately a forty five degree angle from said outlet port of said curved projection at the first end of said handle; and c) an elongated flexible tube coupled at one end to said stub pipe and at an opposite end to the vacuum unit.

4. A new style trim knife as recited in claim 3, further including means on a second end of said handle for making markings on the molded product to identify the person operating said knife after the loose cut off protrusions and rises have been removed therefrom by the suction action from the vacuum unit.

5. A new style trim knife as recited in claim 4, wherein said marking making means is a stamp member at said second end of said handle.

6. A new style trim knife as recited in claim 5, wherein said stamp member includes a base having at least one raised number and letter thereon, so that an impression can be made into the molded product to indicate the person operating said knife.

7. A new style trim knife as recited in claim 6 further including:
   a) said handle having a recessed area extending inwardly at said second end thereof;
   b) a projection extending from a rear surface of said base, which fits into said recessed area; and
   c) a setscrew extending transversely into said handle to engage with said projection, so as to retain said stamp member against said second end of said handle, thereby making said stamp member removable and replaceable.

8. A new style trim knife as recited in claim 7, wherein said handle, said finger grip, said curved projection, said stub pipe and said stamp member are all integral to each other and are made out of a durable strong material.

9. A new style trim knife as recited in claim 8, wherein said blade with said saw teeth is fabricated out of a durable metal material.

* * * * *